United States Patent [19]

Kuhn et al.

[11] Patent Number: 5,107,094

[45] Date of Patent: Apr. 21, 1992

[54] VEHICLE HEATING SYSTEM WITH FAILURE DETECTION MEANS

[75] Inventors: Edgar Kuhn, Gerlingen/Leonberg; Rainer Leunig, Gerlingen; Rainer Mittag, Kornwestheim; Guenter Schramm, Vaihingen-Enzweihingen, all of Fed. Rep. of Germany

[73] Assignee: Robert Bosch GmbH, Stuttgart, Fed. Rep. of Germany

[21] Appl. No.: 527,114

[22] Filed: May 21, 1990

[30] Foreign Application Priority Data

Jun. 15, 1989 [DE] Fed. Rep. of Germany ....... 3919563

[51] Int. Cl.$^5$ .................. B60H 1/22; F28F 27/00; H02J 7/14; H05B 1/02
[52] U.S. Cl. .................. 219/202; 219/203; 307/10.7
[58] Field of Search .................. 219/202–208, 219/279; 237/12.3 R; 165/41–43; 307/10.7

[56] References Cited

U.S. PATENT DOCUMENTS

| 3,576,970 | 5/1971 | Cherry | 219/202 |
| 3,673,379 | 6/1972 | Eversull | 219/202 |
| 4,075,504 | 2/1978 | Gnaedinger | 307/10.7 |
| 4,084,126 | 4/1978 | Clements | 307/10.7 |
| 4,413,222 | 11/1983 | Gansert et al. | 320/48 |
| 4,950,972 | 8/1990 | Berg | 219/202 |
| 4,967,056 | 10/1990 | Iwasa | 219/203 |
| 4,967,137 | 10/1990 | Canitrot et al. | 219/203 |
| 4,985,671 | 1/1991 | Sauer | 219/203 |

FOREIGN PATENT DOCUMENTS 390698 10/1990 European Pat. Off. .
64-19925 1/1989 Japan .

Primary Examiner—Bruce A. Reynolds
Assistant Examiner—John A. Jeffery
Attorney, Agent, or Firm—Michael J. Striker

[57] ABSTRACT

An electrical heating arrangement for a motor vehicle comprises a heating resistor that is energizable directly by the power generator provided that within a network of consuming devices failure has been detected and also provided that essential elements of the network such as battery or engine temperature are within predetermined limits. Upon detection of a failure this error condition is optically indicated and the connection between the heating resistor and the generator is interrupted.

14 Claims, 4 Drawing Sheets

: 1

VEHICLE HEATING SYSTEM WITH FAILURE DETECTION MEANS

BACKGROUND OF THE INVENTION

The present invention relates to an electrical heating arrangement in a motor vehicle having an electrical network including a power generator, a regulator for the generator, a battery, consuming devices connected to the battery, a battery charge indicator, a heating element and switching means for connecting, in one switching position, the power generator to the heating element and, in another switching position, the power generator to the battery.

It is conventional to heat passenger space in a motor vehicle by means of cooling water of the engine. At low outdoor temperatures it takes relatively long time to heat the passenger space to a desired temperature.

In order to speed up the temperature rise in the passenger space, it is possible by means of the generator and heater elements to utilize power supplied by the generator to accelerate the heating to the desired temperature.

An electrical heating system for motor vehicles of this kind is known for example from the DE-OS 35 09 073. It describes a heating arrangement wherein a number of heating resistors is connected to the plus terminal of the generator or of the battery to utilize excessive direct current supplied by the generator to the battery which in turn power supplies the electrical consuming devices. This arrangement also includes a control device which prevents a discharge of the battery due to the switchover of the generator power for the heating purposes.

This known electrical heating arrangement has several disadvantages. First, only the excessive part of the generated power is employed for the heating of the motor vehicles and therefore the heating efficiency is not very effective. Secondly, there is no possibility to indicate failures in the heating and power supply arrangement, for example the interruption of the battery charging cable or an interruption of the cable connecting the generator with the heating element.

SUMMARY OF THE INVENTION

It is therefore a general object of the present invention to overcome the aforementioned the disadvantages.

More particularly, it is an object of the present invention to provide an improved heating arrangement for motor vehicles which speeds up the heating of the passenger space.

Another object of this invention is to provide a heating arrangement which, by periodic switchovers of the generator between "charging" and "heating" modes of operation and by utilizing during the time of its connection to the "heating" operation uses the entire output power of the generator for heating, considerably accelerates the heating up of the passenger compartment of the vehicle.

An additional object of the invention is to provide such an improved heating arrangement using a standard power generator in connection with switching means which switch over from "charging" to "heating" and vice versa without consuming electrical current, thus avoiding in practice any interferences.

Another object of this invention is to monitor the charge of the battery and to control the switchover of the generator to "heating" only during an adequate charged condition of the battery so that the battery does not become excessively discharged.

A further object of this invention is to provide such an improved arrangement wherein a plurality of possible failures is monitored and a detected failure is indicated and, depending on the nature of the detected failure, the electrical heating is disconnected.

In keeping with these objects and others which will become apparent hereafter, one feature of the invention resides, in a heating arrangement of the above described kind, in the provision of safety means for detecting a failure in the electrical network of the motor vehicle, means for indicating a detected failure and means for interrupting, in response to a detected failure, the connection between the power generator and the heating element.

If the regulator for the power generator is a voltage regulator connected in series with a current converter, then a continuous regulation of the heating power by means of an excitation current controlled via the current converter can be adjusted according to different operational requirements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
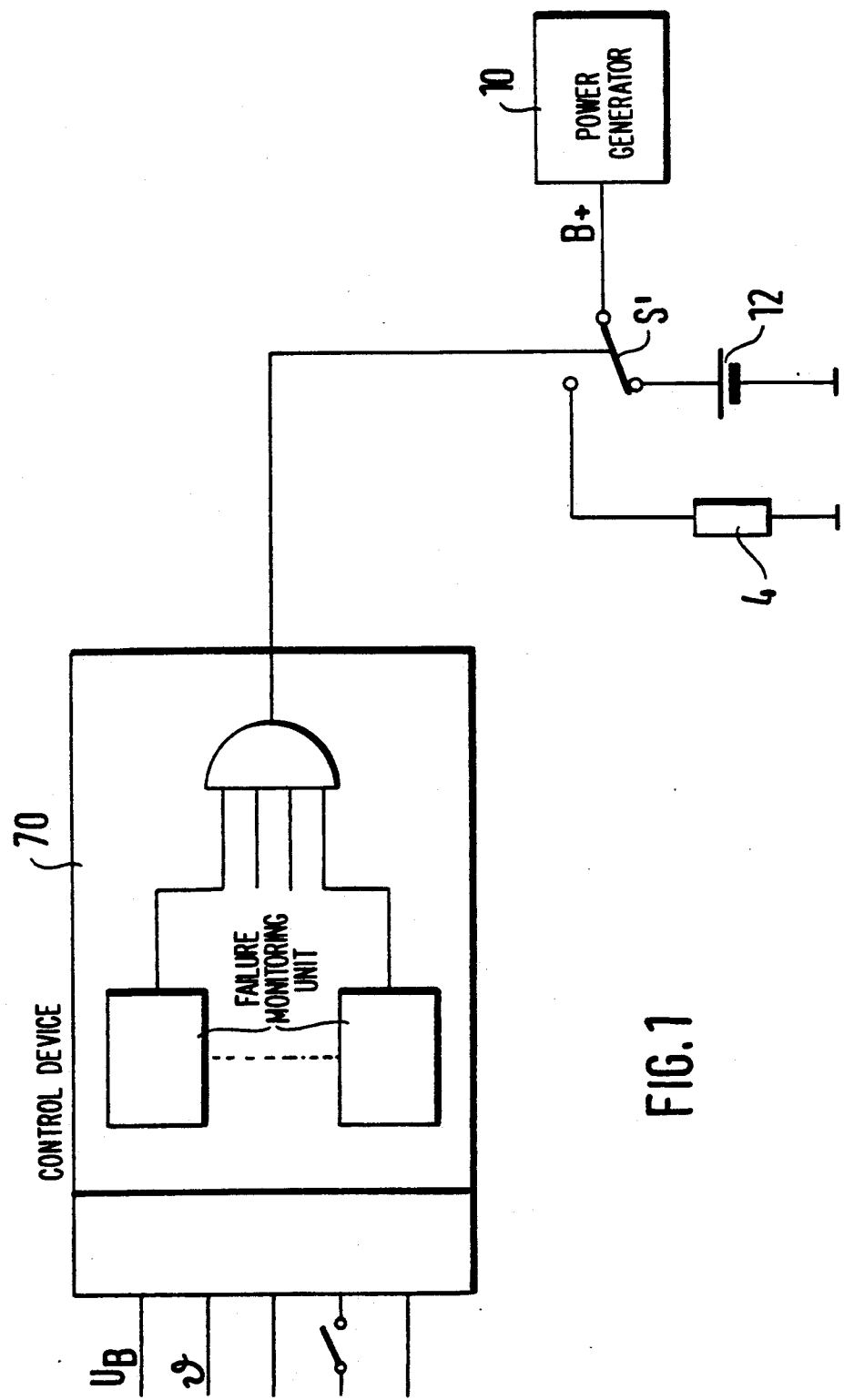
FIG. 1 is a simplified block circuit diagram of the electrical heating arrangement of this invention.

The schematic block circuit diagram of the heating arrangement of this invention, shown in FIG. 1, includes a conventional power generator 10 whose output terminal B+ is connected to the switching contact of a switch S'. The switch selectively connects the output of the generator to a heating element 4 or to a battery 12. The actual switch S' includes several switching elements actuated either directly, for example by pressing a push button or by means of control signals via a relay. The switching contact of the switch S' is controlled by signals from a control device 70. The control device has a plurality of inputs for receiving input signals indicative of various operational parameters of the vehicle such as signals from a temperature sensor in the passenger space or the vehicle, from a volt meter which measures the battery voltage or from another temperature sensor which measures the temperature of cooling (heating) water, and the like.

The control 70 also includes a safety logic which includes a plurality of failure monitoring units, for example for monitoring the battery voltage, an operation without battery, interruption of field winding of the generator, the interruption of the heating element and the like. The task of these safety logic means is to permit the "heating" only then when values of all operational variables being monitored are within a prescribed tolerance range. If the value of a monitored parameter is outside the tolerance range or if it has reached a predetermined value or if the failure has been detected in the entire electrical network, the generator cannot be used for "heating" and this condition is signalized by an indicator. The indication can be performed by the existing charge controlling lamp or by means of separate lamps or light emitting diodes. The heat generated by the heating resistor can be used either for the fast heating of the cooling water or directly radiated into the motor vehicle, for example by means of a blower.

The heating resistor can also include an electrically heatable window pane of the motor vehicle which is directly power supplied from the generator.

Instead of a single generator it is possible to use two generators of which one serves for "heating" or "charging" and the other only for "charging".

Figure 2:
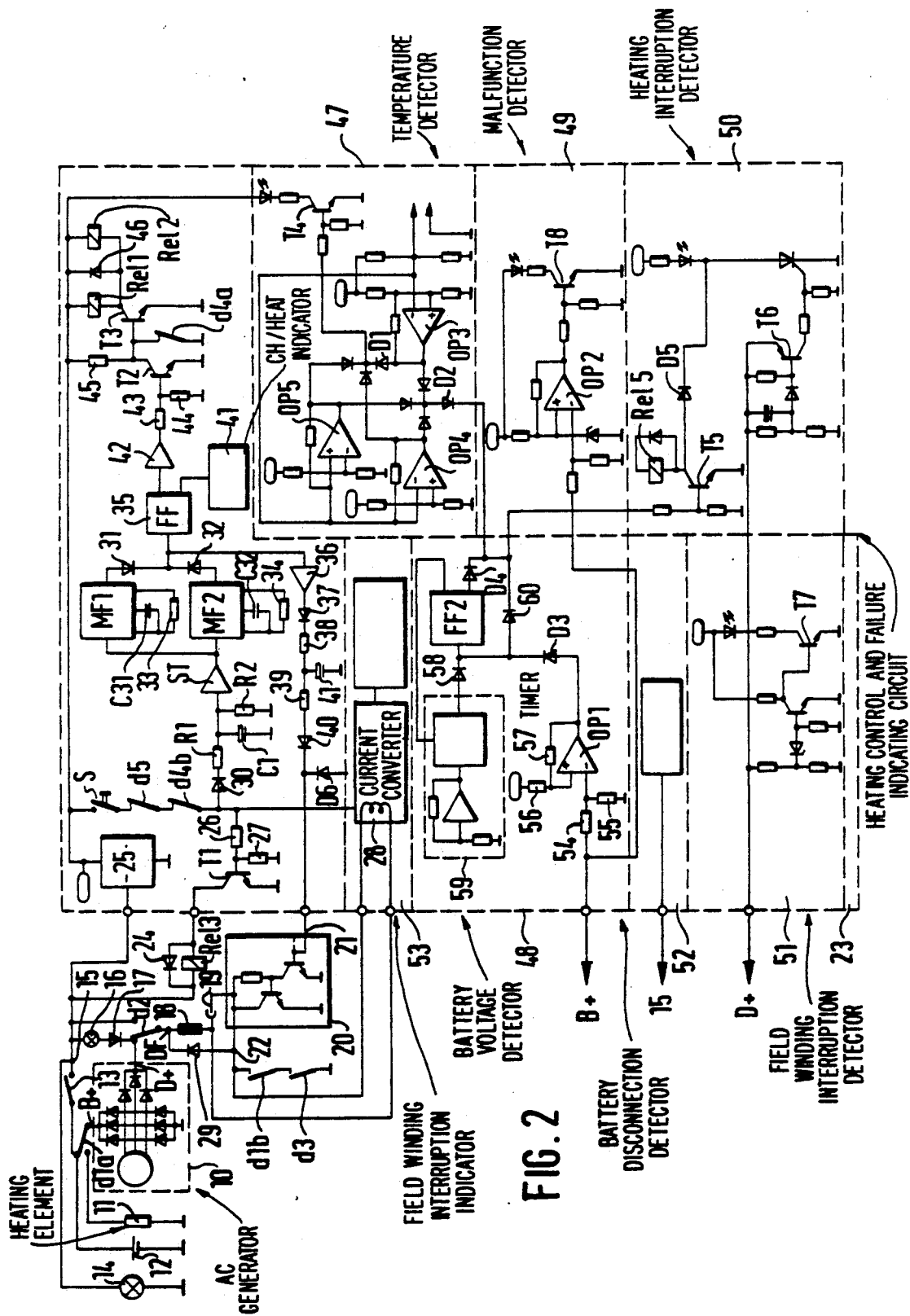
FIG. 2 is a detailed circuit diagram of the electrical arrangement according to this invention.

FIG. 2 illustrates the entire circuit diagram of the electrical heating arrangement for a motor vehicle as well as part of the electrical network of the motor vehicle together with monitoring and controlling circuits for the heating arrangement. Conventional structural units such as an alternating current generator with the associated rectifying bridges and voltage regulators are indicated only schematically.

The conventional alternating current generator having standard terminals B+, D+, DF, D− and together with rectifying and excitation diodes is denoted by the reference numeral 10. The generator terminal D+ is selectively connected via a switch d1a to a grounded heating element 11 or to the plus pole of a battery 12 whose minus pole is also connected to ground. Between the plus pole of the battery 12 and the ground is connected via an ignition switch 13 an electrical network including various consuming devices 14.

The contact 15 of the ignition switch 13 remote from the battery) is connected via a series connection of a charge indicating lamp 16 and a forward connected diode 17 with the generator terminal D+. A field or excitation winding 18 of the generator is connectable via switch d2 with the generator terminal D+, and the other end of the field winding 18 is connectable via a connector plug 19 to a voltage regulator 20. The DF end of the field winding 18 connected to the switch d2 is also directly connectable to the terminal 15. A heating control and failure indicating circuit block 23 has its inputs directly connected to the terminals 15, 21, 22, B+ and D+. In addition, a line with a relay Re13 with a parallel connected extinguishing diode 24 connects an input of the circuit block 23 to the terminal 15.

The heating control and failure indicating circuit block 23 includes a stabilizer 25 for delivering a positive stabilized voltage $U_{Stab}$. One input of the stabilizer is connected with the terminal 15, a second input is grounded and a third input is connected to a contact of a switch S for switching over heating and charging conditions. Additional switches d5 and d4b are connected in series with the switch S and with a grounding voltage divider 26, 27. The tap point of the voltage divider is connected to a base of a transistor T1 whose emitter is grounded and whose collector is connected to the relay Re13.

The connection point between the switch d4b and the resistor 26 is also connected to the input of a current converter 28 whose further inputs are connected to the terminals 22 and 19 of the voltage regulator. Series connection of two switches d1b and d3 is connected between the terminal 22 to the voltage regulator and ground, and the terminal 22 is connected with the DF end of the excitation winding 18 via a forward connected diode 29.

A series connection of a diode 30 and resistor R1 of a voltage divider R1, R2 is connected to an input of a Schmitt-trigger ST. The resistor R2 of the voltage divider is connected in parallel to the capacitor C1, and the output of the Schmitt-trigger ST is connected to inputs of two monostable multivibrators MF1 and MF2. The outputs of the multivibrators are connected via forwardly connected diodes 31 and 32 to the input of a flipflop 35. The other inputs of the respective monostable multivibrators MF1 and MF2 are interconnected by capacitors C31, C32 and resistors 33, 34, respectively.

The connection point of the diodes 31 and 32 at the outputs of the multivibrators MF1, MF2 is also connected via a series connection of an amplifier 36, a diode 37, resistors 38 and 39 and a further diode 40 to the terminal 21 of the voltage regulator 20. The connection point of the resistors 38 and 39 is connected to ground by a capacitor 41 and an output of the current converter 28 is connected via a further diode 26 to the cathode of the diode 40.

One output of the flipflop 35 is connected with a charging/heating indicator 41) whereas the second output of the flipflop is connected via a series connection of an amplifier 42, and a resistor 43 of a voltage divider 43, 44 to the base of a transistor T2. The resistor 44 and the emitter of the transistor T2 are grounded and the collector of the transistor is connected via a resistor 45 to the output of the stabilizer 25. The collector of the transistor T2 is connected to the base of the transistor T3 having a grounded emitter. The collector-emitter path of the transistor T2 is bridged by a switch d4a. The collector of the transistor T3 is connected to the output of the stabilizer 25 via excitation windings of relays Re11 and Re12. The relay windings are bridged by an extinguishing diode 46.

In addition to the above described structural elements, the heating control and failure indicating circuit block 23 includes further structural modules which serve for determining the temperature of cooling (heating) water and for monitoring battery voltage. Furthermore, the circuit block 23 includes five additional structural modules for determining and indicating various failures which may occur in the entire electrical network. The latter structural modules will be explained in the following description as far as are relevant for the invention or for the operation of the control and indicator block 23. They include a module 47 for determining temperature of cooling (heating) water, a module 48 for determining and monitoring battery voltage, a module 49 for determining a malfunction of the battery voltage monitoring module, a module 50 for monitoring the interruption of the connection to the heating element, a module 51 for determining the interruption of the connection to the field winding of the generator, a module 52 for determining an operation without battery, for example during the disconnection of the battery charging cable, and an indicator circuit 53 for determining the interruption to the field winding in a circuit employing a current converter. All of these modules 47 through 53 are supplied with the positive stabilized voltage $U_{Stab.}$ from the output stabilizer 25.

The module or subcircuit 48 for monitoring the battery voltage includes an operational amplifier OP1 whose inverting input is connected via a resistor 54 to the battery terminal B. and via a resistor 55 to ground. The non-inverting input of the operational amplifier OP1 is connected via a resistor 56 to the output voltage of the stabilizer. A feedback resistor 57 connects the output of the operational amplifier OP1 to its non-inverting input.

The output of the operational amplifier OP1 is further connected via a diode D3 to the input of a flipflop FF2. A timing circuit 59 has its output connected via a diode 58 to the input of the flipflop FF2 and the output of the flipflop is connected to an input of the timing circuit. The other output of the flipflop FF2 is connected via diode D4 to the subcircuits or modules 47 and 50. A diode 60 connects the input of the flipflop FF2 with the cathode of the diode D4.

Figure 3A:
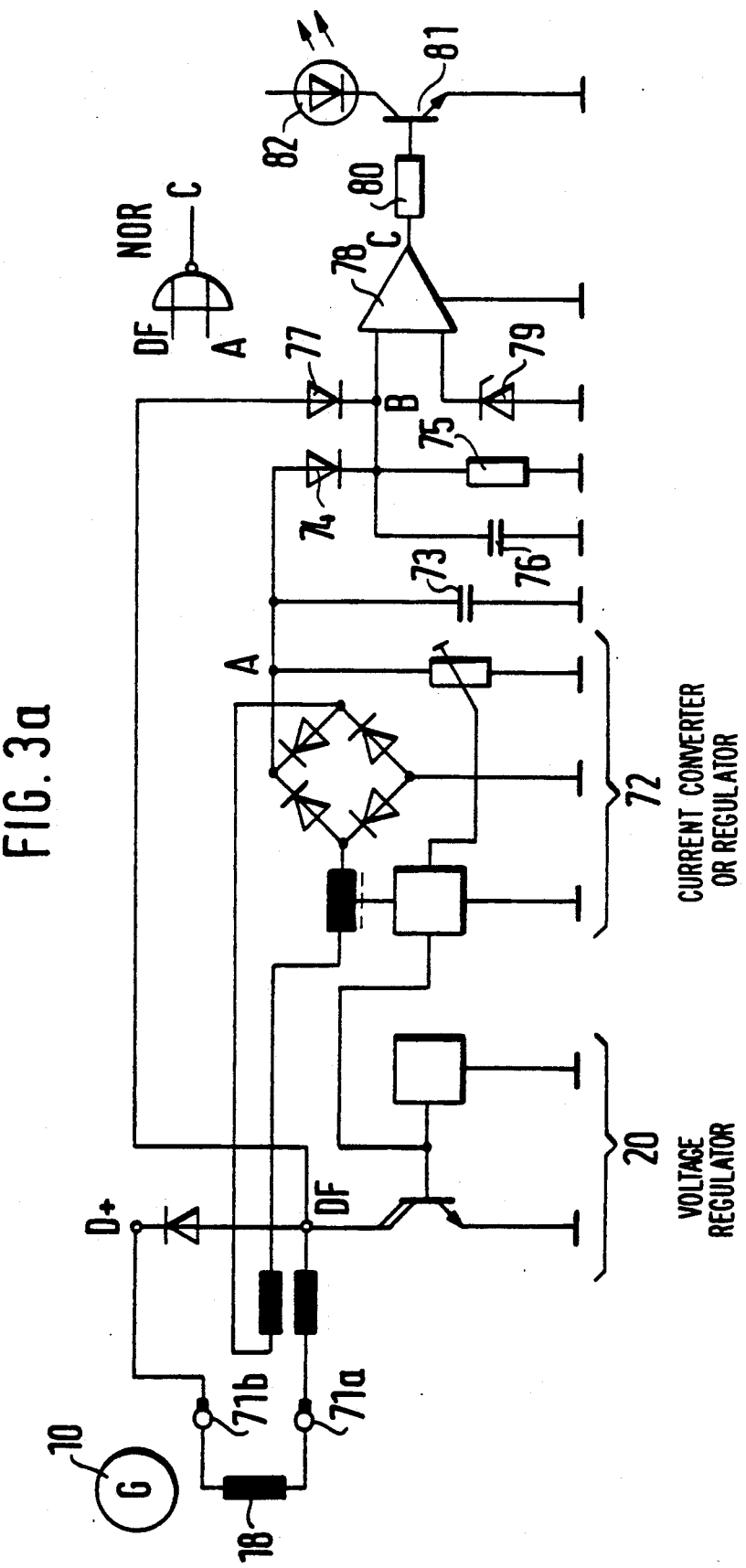
FIG. 3a is a circuit diagram of a monitoring device for detecting and indicating interruption of the field winding of the power generator operating with a regulator having a current converter.

FIG. 3a shows by way of an example an indicator circuit for detecting and indicating an interruption in the connection to the field winding 18 of the alternating current generator 10. The field winding 18 is connected via sliding rings 71a, 71b to the inputs of a known voltage regulator 20 which is connected in series with a known current regulator 72. The actual subcircuit for determining and indicating an interruption to the field winding 18 is connected to the input of the current converter or regulator 72.

Between the point A of the current regulator 72 and ground is a capacitor 73 connected via a diode 74 to a parallel connection of a capacitor 76 and a resistor 75. The connection point between the cathode of the diode 74 and the resistor 75 is connected to an input B of an operational amplifier 78. A terminal DF of the power generator 10 is also connected via a diode 77 to the input B of the operational amplifier. The other input of the operational amplifier 78 is connected to ground via a Zener diode 79. The output C of the operational amplifier is connected via a resistor 80 to the base of a transistor 82 whose collector controls a light emitting diode 82. The collector of the transistor 81 is grounded.

The operation of the indicator circuit corresponds to that of an NOR-gate having inputs DF and A and an output C.

Figure 3B:
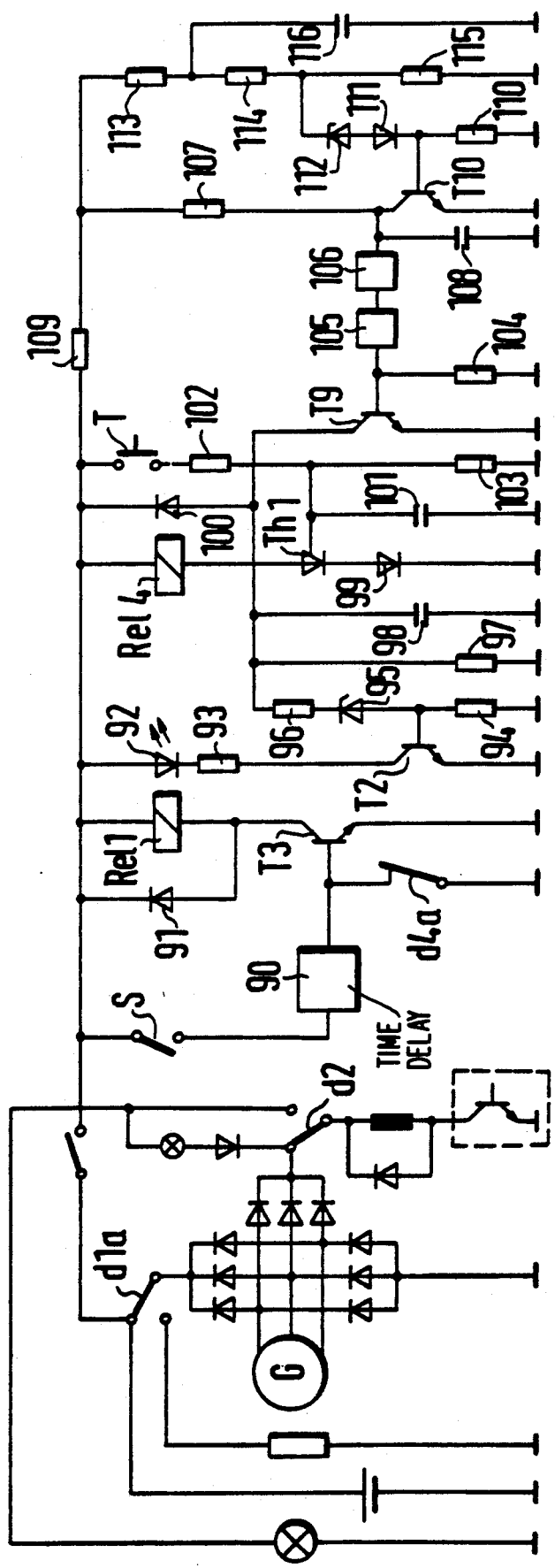
FIG. 3b is a monitoring circuit for detecting and indicating an operation without battery, the power generator having a regulator without a current converter.

FIG. 3b shows an embodiment of a circuit for indicating and determining a failure in connections to the battery, if connected between the terminal 15 and ground, and is illustrated in cooperation with a power generator operating without a current converter.

The switch S serves for switching between "charging" and "heating" positions and is connected to a time delay circuit 90 whose output is connected with a base of a transistor T3. The emitter of the transistor T3 is connected to ground and the base-emitter path is bridged by a switch d4a. The collector of the transistor T3 is connected to the terminal 15 via a relay Re1.1 whose excitation winding is bridged by an extinguishing diode 91. A series connection of a light emitting diode 92, a resistor 93 and a collector-emitter path of a transistor T2 is connected between a terminal 15 and the ground. The base of the transistor T2 is connected via a resistor 94 to the ground and via a series connection of a Zener diode 95, a resistor 96 and a relay 4 to the terminal 15. A parallel connection of a resistor 97, a capacitor 98 and a thyristor Th1 in series with the diode 99, is connected across the series connection of elements 94, 95 and 96. The excitation winding of the relay Re14 is bridged by a diode 100.

The ignition input of the thyristor Th1 is connected via connected to a tap point of a voltage divider 102, 103 whose resistor 103 is bridged by a capacitor 101. The free end of the resistor 102 is connected via a push button switch D to the terminal 15.

The anode of the thyristor Th1 is connected via the collector-emitter path of a transistor T9 to ground. The base of the transistor T9 is connected to ground via a resistor 104 and is further connected via a time delay circuit 105 and a threshold circuit 106 to the collector of a transistor T10. The emitter of the transistor T10 is grounded and the collector-emitter path of the transistor is bridged by a capacitor 108. The collector of the transistor T10 is connected via a series connection of resistors 107 and 109 to the terminal 15.

The base of the transistor T10 is connected to the tapping point of a voltage divider constitute by a series connection of a resistor 110 and a diode 111 which is connected in series a Zener diode 112. Between the connection point of the resistor 107 and 109 and the ground is a further voltage divider assembled of resistors 113, 114 and 115. The connection point of the resistor 114 and 115 is connected to the cathode of the Zener diode 112 and the connection of the resistors 117 and 114 is connected to ground via a capacitor 115.

The circuits shown in FIGS. 3a and 3b represent respectively possible examples of the modules 52 and 53 in FIG. 2. In the following explanation of the operation of the circuit of FIG. 2, reference will be made to the examples of FIGS. 3a and 3b.

The operation of the circuit of FIG. 2 is as follows:

When the switch S is in its illustrated "charging" position, the generator then charges via contact d1a of the switch S the battery 12 and power supplies the consuming devices 14 in the electrical network of the motor vehicle. Contact d2 connects in the illustrated position the terminal DF of field winding 18 to the terminal D+ of the generator if switching condition corresponds to a standard known from contemporary motor vehicles. If the switch S is switched over to "heating" position, a distinction must be made whether (1.) the generator operates without a current converter (according to FIG. 3b) or (2.) with a current converter (FIG. 3a).

As to 1. Operation without current converter (FIGS. 2, 3b):

After the push button switch T has been pressed, thyristor Th1 becomes conductive, relay Re14 is energized and opens the contact d4a.

The contact d4b is closed by the relay Re14. If the switch S has been switched over to "heating" the relay Re1.3 is energized and contact d3 closed. A signal delayed by elements R1, C1 reaches via the Schmitt-trigger ST the input of the monostable multivibrators MF1 and MF2, whereby MF1 triggers in response to the positive and MF2 in response to the negative flank of the signal.

MF1 after being triggered by the positive flank of input signal generates an output pulse which blocks the voltage regulator 20 and interrupts the excitation of the power generator. The length of the output pulse is adjusted according to the desired excitation of the generator.

With negative flanks of this blocking pulse the flipflop 35 is reset to brings the transistor T2 into a blocking condition and the transistor T3 into a conductive condition. The relays Re11 and Re12 become energized and via the switching contacts d1a, and d2 switch-over without current the generator to a "heating" operation. The battery 12 is now connected via the contact d2 to the field winding 18. The end stage of the voltage regulator 20, in order to compensate voltage drop of the conductive end stage, is short-circuited by contacts d1b and d3. Consequently, an increased excitation current and an increased heating power result. The contact d1a connects the generator directly to the heating element 11. This switching condition remains so long until a) the module 47 for monitoring a temperature of heated water has responded or b) the module 48 for monitoring the battery voltage has switched-over to "charging" operation.

As to a):

If the temperature of the cooling (heating) water reaches a preset value, relay Re15 is energized via D2 and D5 and opens the contact d5. Since this contact is series connected with switch S, its switching condition corresponds to the switchover of S from "heating" to "charging". MF2 is triggered by the negative flank of its input signal and generates an output pulse which blocks the voltage regulator and interrupts the excitation of the generator. Also in this case the length of the output pulse is selected such as to deenergize the generator.

The negative flank of the output pulse resets again the flipflop 35, relays Re1.1 and Re1.2 are deenergized and the generator is restored to its original condition (for power supplying the consuming devices 14). Operational amplifier OP4 and OP5 monitor the temperature sensors. In the event of a short-circuit or interruption, the charging operation is switched over. At the same time a failure warning is activated, for example with a light emitting diode turned on by the transistor T4.

As to b):

If the battery voltage drops below a preset value then via D3 the timing circuit 59 is actuated. The timing circuit controls via D4 the voltage transistor T5 and the relay Re1.5 is energized.

Since the contact of the relay is connected in series with switch S, its actuation corresponds to the switchover from "heating" to "charging". MF3 is triggered and generates an output pulse which locks the regulator and interrupts the excitation of the generator.

The negative flank of the pulse switches over the flipflop FF1, relays Re1.1 and Re1.2 are deenergized and the generator is reset to its original operating condition (power supplying the consuming devices 14 of the electrical network).

This switching condition remains so long until time set by the timing circuit 59 has expired and the battery voltage has exceeded the set voltage value. If during this charging time a preset voltage value has not been reached, the timing circuit 59 is reset by a reset signal. This setting and resetting process is repeated so long until the preset battery voltage is reached or exceeded.

Thereafter, if desired, the heating operation is restored. By the switching measures it is guaranteed that the charging of the battery has a priority.

In the event that a line for the battery voltage monitoring is disconnected, this failure is indicated by elements OP2, T8 and for example by a LED. The control device in this case switches over by OP1 to the charging operation inasmuch as this corresponds to falling short of a preset battery voltage.

If during the heating operation a heating element 11 is destroyed or interrupted, the voltage at terminals B+ and D+ of the generator abruptly rises and after reaching a preset voltage level, the thyristor Th2 is triggered by the transistor T6 and a corresponding failure indication is effected for example by a LED. At the same time, the relay Re1.5 is actuated via D5 and the conductive Th2, and the contact d5 opens. This corresponds to the switching condition "charging" of the switch S. Due to the ignited Th2, the relay Re1.5 is activated and consequently the function "charging" continues.

If the voltage at the terminal D+ drops, this signals an "interruption of the excitation winding". This failure is indicated by a LED via the transistor T7.

As to 2. Operation of the generator with a current converter.

In this circuit modification the switch S as well as switching contacts d1b and d3 are dispensed with.

If the current converter or regulator 72 is used together with the voltage regulator 20 according to FIG. 3a, it is possible to provide a continuous regulation of the heating power by means of the excitation current of the generator (the heating output can be regulated to a predetermined value).

The difference with respect to the operation without the current converter resides in that, after the deenergization of the generator, the excitation current of the generator is controlled by the current converter. During the charging operation the current converter is disconnected. The indication of the interruption of the field or excitation winding in this case is performed as follows:

Failure: Interruption of the field winding (FIG. 3a)

The circuit indicates the interruption between D+ and DF, such as for example the interruption of the field winding or the worn out carbon brushes by an optical signal. Through the combination of the voltage and current regulators, in combination with NOR gate, the following functions are achieved:

1. If in the case of an intact structure the field or excitation current is small, a high voltage is at the terminal DF and a smaller voltage is at the point A. At the output of the NOR-gate results a 0 level (1v0=0). The LED must light up.

2. If the field or excitation current is large, the voltage at DF is small and at the point A large; accordingly 0v1=0 and in either case the LED does not light up.

3. If the field winding has an interruption then voltage levels both at DF and at the point A are 0, consequently 0v0=1, the LED is activated and the failure is optically indicated.

Failure: Operation without battery (for example due to a disconnected battery cable) is recognized by the circuit according to FIG. 3b.

When during the operation without battery the switch is activated from "charging" to "heating", then consuming devices such as for example lamps 14, connected to the terminal 15 would be without voltage because relay contact d1a would move from 1 to 2. This is prevented by the circuit according to FIG. 3b as follows:

When the switch S is switched over without a connected battery, the generator as described before, is deenergized for a current free switchover, that means the generator voltage and thus the voltage at the terminal 15 starts to decay according to a e-function (approximately 150 milliseconds) toward zero.

If the voltage at the terminal 15 drops below a value of about 7 volts, the transistor T10 is not conducting, the transistor T9 is momentarily conducting and therefore the thyristor Th1 is non-conducting. Relay Re14 is deenergized and the transistor T3 is blocked via the contact d4a. Consequently, the relay Re11 also becomes deenergized and the arrangement remains in the "charging" switching condition. The threshold of 7 volts has been selected in order to prevent a response of the circuit during its normal operation. The threshold of 7 volts should not be passed below. If, namely, the generator be excitable down to 0 volt, there would be the risk that under load further excitation would, be impossible. The deenergization or deexcitation, therefore, is stopped at approximately 7 volts.

Since the thyristor Th1 at an operation with the battery would become unpredictably non-conductive due to a possible voltage drop during starting, it must be reignited after the starting by pressing the push button switch T. The push button can be replaced by a suitable automatic switching circuit. The failure is indicated by an indicator lamp 92 or by a LED.

What is claimed as new and desired to be protected by Letters Patent is set forth in the appended claims:

1. An electrical heating arrangement in a motor vehicle having an electrical network including a power generator, a regulator for the generator having a field winding, a battery, consuming devices connected to the battery, a battery charge indicator, a heating element, switching means for connecting, in one switching position, the power generator to the heating element and, in another switching position, the power generator to the battery, means for failure detection in the electrical network including means for detecting electrical parameters of the electrical network, said electrical connection to the heating element and an electrical connection to the field winding of the generator, said means for failure detection having safety logic means which detects whether the electrical parameters of the electrical network are within predetermined bounds and said means for failure detection being connected to said switching means; means for indicating a detected failure detected by said means for failure detection when at least one of said electrical parameters is outside of said predetermined bounds; and means for interrupting, in response to the detected failure, the connection between said power generator and said heating element.

2. An electrical heating arrangement as defined in claim 1, wherein said regulator consists of a voltage regulator connected between a field winding of the power generator and said failure detecting means.

3. An electrical heating arrangement as defined in claim 2, further comprising a current converter connected in series with a voltage regulator and being connected between said field winding and said voltage regulator.

4. An electrical heating arrangement as defined in claim 1, further comprising means for indicating the connection of the power generator to the heating element.

5. An electrical heating arrangement as defined in claim 1, further comprising means for sensing a predetermined temperature in the motor vehicle, and said interrupting means disconnecting said power generator from said heating element in response to a sensed predetermined temperature value.

6. An electrical heating arrangement as defined in claim 1, further comprising means for deenergizing said generator during the actuation of said switching means so that the generator is switched over from "heating" to "charging" and vice versa in a current-free or deenergized condition.

7. An electrical heating arrangement as defined in claim 2, wherein in the switching condition "heating" the voltage regulator is short circuited to increase the excitation current.

8. An electrical heating arrangement as defined in claim 1, further comprising an auxiliary power generator operable exclusively for charging the battery.

9. An electrical heating arrangement as defined in claim 1, further comprising means for controlling said switching means such that upon the detection of a failure during the heating operation a switchover from "heating" to "charging" takes place and during the detection of a failure during the charging operation the switchover "heating" is prevented.

10. An electrical heating arrangement as defined in claim 3, wherein during the operation of said current converter the consumed power of said heating element is regulated by changing the excitation current delivered by said current converter.

11. An electrical heating arrangement as defined in claim 1, wherein said heating element is an ohmic resistor.

12. An electrical heating arrangement as defined in claim 1, wherein said heating element is an electrically heatable pane in the motor vehicle.

13. An electrical heating arrangement as defined in claim 3, further comprising at least one rectifying diode for delivering an excitation current to an excitation current is limited by a given temperature of said diode.

14. An electrical heating arrangement in a motor vehicle having an electrical network including a power generator, a regulator for the generator, a battery, consuming devices connected to the battery, a battery charge indicator, a heating element, switching means for connecting in one switching position the power generator to the heating element and, in another switching position, the power generator to the battery, means for failure detection in the electrical network connected with said switching means having sensors for detection of electrical parameters of the electrical network, said electrical parameters including battery voltage and an interruption of connection to the heating element and the field winding of the generator, said sensors generating signals in response to said electrical parameters, said means for failure detection having safety logic means which detects whether the signals are within predetermined bounds and for indicating a detected failure in said electrical network, when at least one of the signals is outside of said predetermined bounds; means for indicating a detected failure; and means for interrupting, in response to the detected failure, the connection between said power generator and said heating element.

* * * * *